Figure 1:
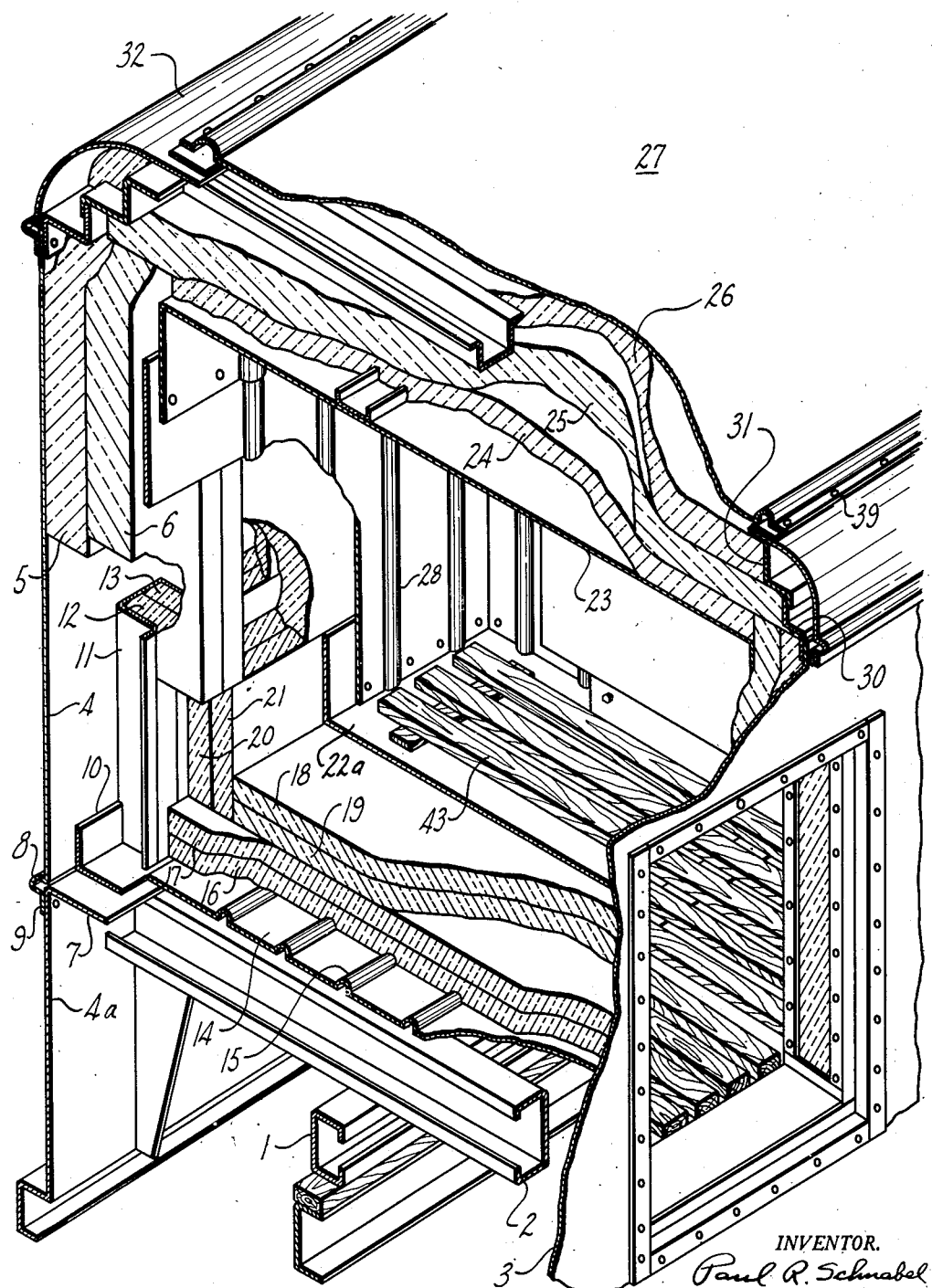

Sept. 30, 1952 — P. R. SCHNABEL — 2,612,028
INSULATED REFRIGERATOR VEHICLE BODY
Filed Nov. 4, 1948 — 2 SHEETS—SHEET 1

INVENTOR.
Paul R. Schnabel
BY William B. Jaspert
Attorney

Sept. 30, 1952  P. R. SCHNABEL  2,612,028
INSULATED REFRIGERATOR VEHICLE BODY
Filed Nov. 4, 1948  2 SHEETS—SHEET 2
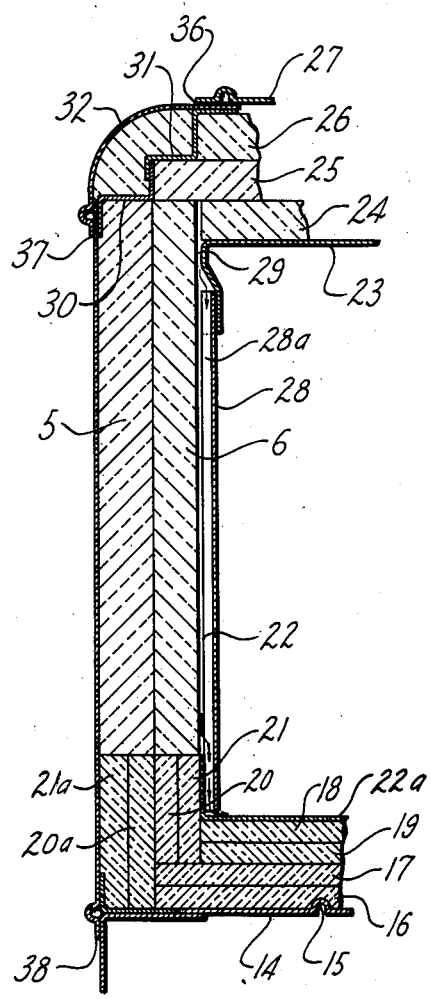
Fig. 2
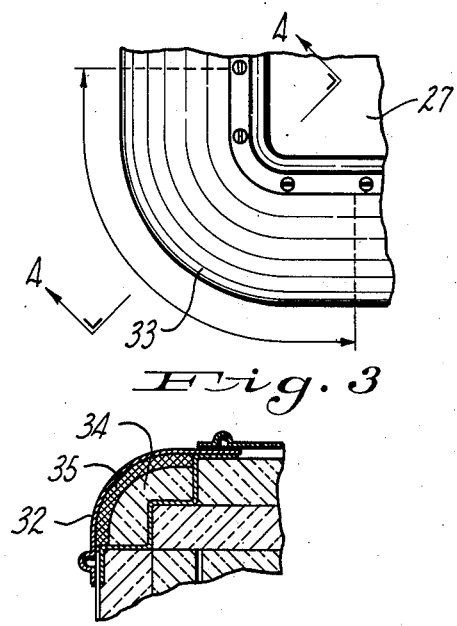
Fig. 3
Fig. 4
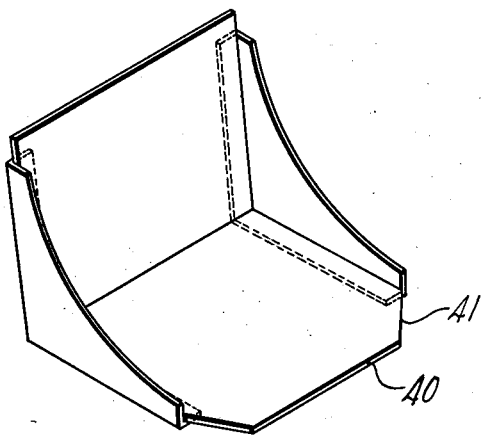
Fig. 5
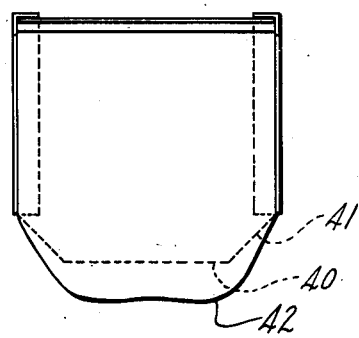
Fig. 6
INVENTOR.
Paul R. Schnabel
BY William B. Jaspert
Attorney Patented Sept. 30, 1952

2,612,028

UNITED STATES PATENT OFFICE 2,612,028

INSULATED REFRIGERATOR VEHICLE BODY

Paul R. Schnabel, Oakmont, Pa., assignor to The Schnabel Company, Pittsburgh, Pa., a corporation of Pennsylvania Application November 4, 1948, Serial No. 58,289

3 Claims. (Cl. 62—15)

This invention relates to new and useful improvements in refrigerator bodies of the type employed on automotive vehicles such as milk and ice cream wagons.

It is among the objects of the invention to provide a refrigerator body of the insulated type in which the base and corner insulation is overlapped or stepped to prevent conduction of heat into the tank type body.

It is another object of the invention to provide an insulated vehicle body in which the insulating material is slightly spaced from the tank or metal portion to collect condensation and conduct it into the tank.

Still a further object of the invention is to provide an insulating body for vehicles in which the roof corner pieces are welded and in which the insulation is protected against the heat of the weld.

These and other objects of the invention will become more apparent from a consideration of the accompanying drawings, constituting a part hereof, in which like reference characters designate like parts, and in which Fig. 1 is a view in perspective, partially in cross section and partially in elevation of an insulated body embodying the principles of this invention;

Fig. 2 a vertical cross section of a side wall of the body;

Fig. 3 a top plan view of a corner of the body;

Fig. 4 a cross section of the corner taken along the line 4—4, Fig. 3;

Fig. 5 a view in perspective of a seat for the body;

Fig. 6 a top plan view of the seat.

In the drawing the numerals 1 and 2 designate longitudinal and cross channel pieces of the vehicle chassis in which is mounted a metal body comprising side walls 3 and 4 with layers of insulation 5 and 6 on the interior of the walls 3 and 4, the body portion being made in sections with a bottom section 4a turned at right angles to form a shelf 7. The top section 4 of the side wall is provided with a bead 8 that forms an overlapping flange 9 with the lower section 4.

Mounted on the shelf 7 is an angle strip 10 that supports uprights 11 filled with layers of insulation 12 and 13. The insulating material 5 and 6 is preferably fiber glass which is commercially available, and the insulating material 12 and 13 is Rubatex, a form of sponge rubber. The bottom of the vehicle body is sheet metal 14 ribbed as shown at 15 for rigidity and strength. Mounted on the floor 14 are four layers of Rubatex, designated by the numerals 16, 17, 18 and 19, and disposed along the inner wall of the vehicle body are Rubatex layers 20, 20a, 21 and 21a.

The unique feature of construction is the stepping of the insulated layers, which is more clearly shown in Fig. 2 of the drawing. The bottom layers 16 and 17 are shown abutting the upright layer 20a, and the side layers 20 and 21 rest upon the layer 17. The upper layers 18 and 19 again abut the vertical layers 21, resulting in a step joint, as shown, which prevents conduction of heat from the exterior to the inner or tank portion of the body. When the wall and floor insulation has been assembled, the so-called tank of the body is lowered into place, which consists of the sheet metal bottom layers 22a, the side walls 22 and the roof or sealing portion 23. Fiber glass insulation is placed on the roof 23, as shown by the layers 24, 25 and 26, with a final roof of sheet metal 27 placed thereon. The side walls of the tank are provided with breather tubes 28 and a slight space of about $\frac{1}{32}$ of an inch, designated by the numeral 29, is left between the fiber glass insulation and the side walls of the tank. This space permits the condensation to accumulate on the exterior of the tank walls and drip down through the passage 28a of the breather tubes as indicated by the arrows in Fig. 2 of the drawings. The moisture accumulates in the bottom of the pan on the surface 22a from which it can be removed. The breather tubes are particularly useful in defrosting the tank, which is done on frequent occasions, and prevents the moisture from passing into the fiber glass layer 6, which loses its insulating qualities when soaked with moisture.

The step construction of the insulation is carried out between the wall sheets 5 and 6 and the roof sheets 24, 25 and 26 as shown in Fig. 2, and metal angle pieces 30 and 31 are provided for this purpose. A curved metal piece 32 is placed along the edges of the roof and formed into a rounded corner 33 as shown in Fig. 3 of the drawings. The corners are packed with fiber glass insulation 34, as shown in Fig. 4, and a layer of asbestos 35, which is preferably surfaced with aluminum foil, is placed at the corners to prevent melting of the fiber glass insulation when the corner pieces are welded.

All of the joints, such as the roof joints 36 and 37 and the lower joint 38, employ tape seals, such as is known in the trade as chromate tape seals, that are held by riveting the flanges to the body as shown at 39, Fig. 1 of the drawings. These tape seals hermetically seal off the walls against circulating air between the wall and the insulating material.

The vehicles herein described may be provided with metal seats 40, having their front corners cut away as shown at 41, to give freedom of action to the legs of the driver. As shown in Fig. 6, the seating pad 42 may overlap the edges 40 and 41 of the seat so that when the driver leaves the seat he can slide forward without any rub or so-called skin burns.

The vehicle may be provided with a wooden slat structure 43, as shown in Fig. 1, on which the burden is stacked and which prevents slipping.

It is evident from the foregoing description of the invention that insulated refrigerator bodies of the type therein described provide for ease of construction, in that they permit completing the insulation structure inside of the vehicle before the tank is lowered therein. Also by means of the stepped insulation at the base and top of the vehicle, circulation is cut off. The breather passages maintain the wall insulation at its greatest efficiency by preventing the accumulation and absorption of moisture, which is common to the use of insulation of metal tanks or bodies. By means of the use of the asbestos and foil liners, the corner pieces may be welded instead of soldered, as has been the practice, thereby forming a stronger and more durable structure at the joints.

Although several embodiments of the invention have been herein illustrated and described, it will be evident to those skilled in the art that various modifications may be made in the details of construction without departing from the principles herein set forth.

I claim:

1. In an insulated refrigerator vehicle body, a side wall structure consisting of a plurality of sections joined and overlapping in the region of the base, the bottom section having a turned-in shelf constituting a flange extending horizontally from the side wall, wall insulation extending in layers parallel with the side wall above said shelf, a metal floor for the vehicle resting on the side wall shelves, insulating layers supported on said floor with their end faces abutting the vertical layer of insulation on the side wall, said side wall and floor insulation being arranged to alternately abut and rest upon each other to form a step joint for the prevention of circulation of air through the joint.

2. In an insulated refrigerator vehicle body, a sheet metal outer wall comprising a plurality of overlapping sections, the bottom section being flanged to constitute a shelf, a sheet metal floor supported on said shelf, sheet insulation disposed in layers parallel to the side wall of the vehicle body and parallel to the sheet metal floor of the body, and a metal tank constituting the inner wall of the body lowered in the vehicle and resting upon the sheet insulation on the floor of the vehicle, said tank being spaced from the insulating side walls of the vehicle and having breather passages for conducting condensation from the walls of the tank inside to the floor of the tank, a sheet metal roof for said tank, and a metal roof for the vehicle with layers of insulation disposed between the tank and vehicle roofs, the roof and side wall insulation being arranged in abutting relation to form a step joint.

3. In an insulated refrigerator vehicle body, a roof structure comprising vertical layers of sheet insulation and horizontal layers of sheet insulation arranged to form a step joint, metal sheathing enveloping the edges of the horizontal and vertical insulating layers, and a rounded metal corner piece extending from the outer roof sheathing to the side wall of the body having insulation disposed therein, said insulation at the corner being fortified by asbestos and foil.

PAUL R. SCHNABEL.

REFERENCES CITED

The following references are of record in the file of this patent:

UNITED STATES PATENTS

| Number | Name | Date |
| --- | --- | --- |
| 1,656,946 | Hauer | Jan. 24, 1928 |
| 1,820,304 | Ellis | Aug. 25, 1931 |
| 1,896,046 | Farrington | Jan. 31, 1933 |
| 1,980,446 | Smith | Nov. 13, 1934 |
| 2,117,397 | Bonsall | May 17, 1938 |
| 2,226,699 | Dietrichson | Dec. 31, 1940 |
| 2,292,365 | DeMore | Aug. 11, 1942 |
| 2,314,657 | Norris | Mar. 23, 1943 |
| 2,393,499 | Flint | Jan. 22, 1946 |
| 2,447,272 | Parkes | Aug. 17, 1948 |